Aug. 14, 1951 H. G. FITZGERALD 2,564,057
PROJECTOR FOR HANDLING TRANSPARENT PLATES
Filed Aug. 20, 1947 2 Sheets-Sheet 2
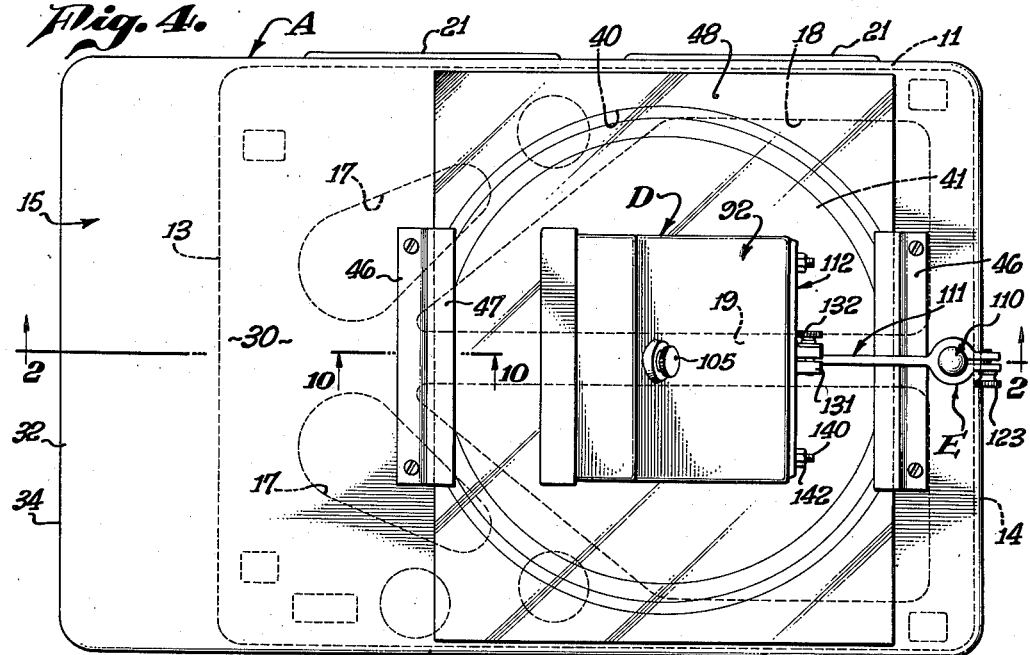
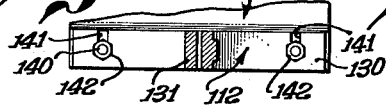
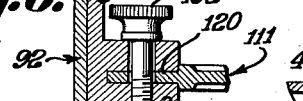
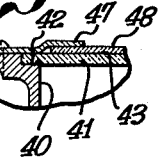
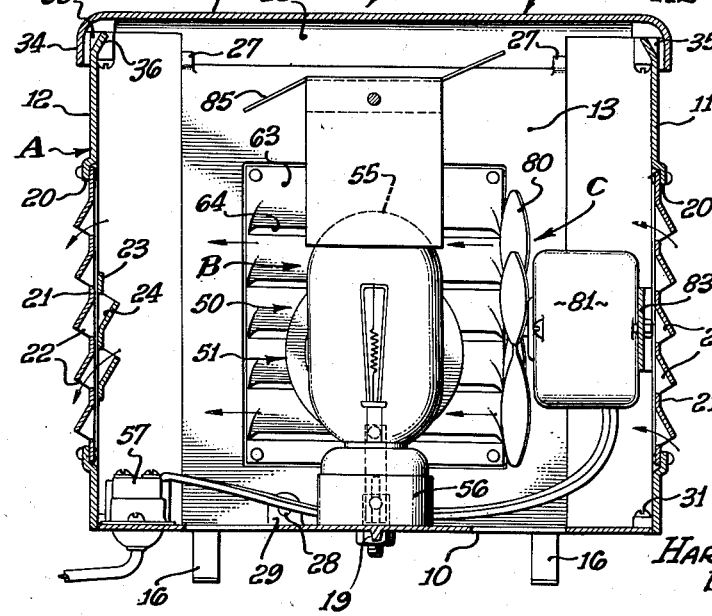
INVENTOR.
HAROLD G. FITZGERALD,
BY
ATTORNEY.

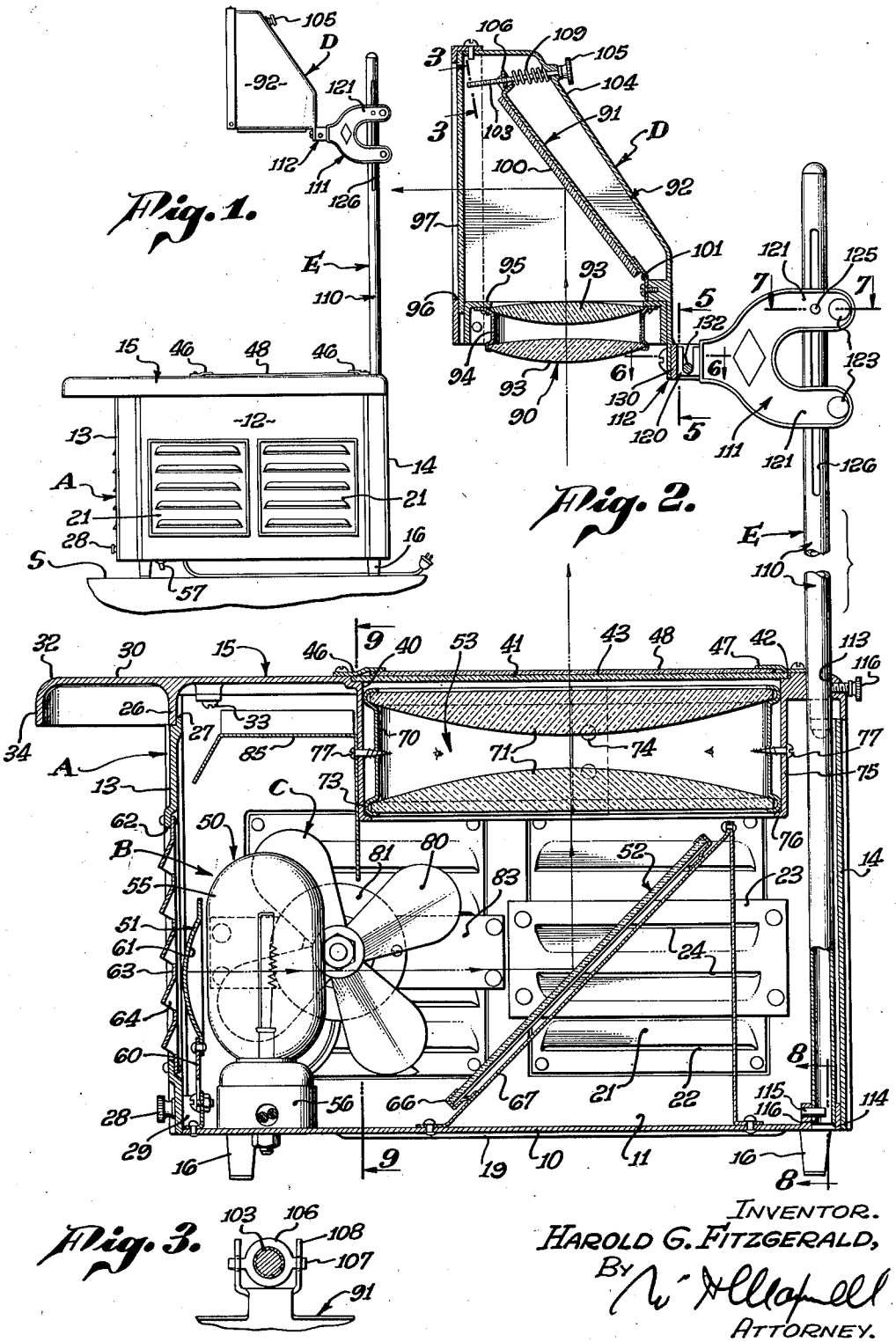

Patented Aug. 14, 1951

2,564,057

UNITED STATES PATENT OFFICE 2,564,057

PROJECTOR FOR HANDLING TRANSPARENT PLATES

Harold G. Fitzgerald, Los Angeles, Calif.

Application August 20, 1947, Serial No. 769,741

4 Claims. (Cl. 88—24)

This invention has to do with a projector for handling transparent plates, it being a general object of the invention to provide a simple, practical, effective device for handling transparent plates or slides and having a wide range of use.

There are many situations where it is desirable to project material or images onto a screen or board. This type of projection is particularly desirable in connection with lectures, speeches, educational work, sales promotional work, etc.

A general object of my present invention is to provide a simple, practical, compact projector having its essential elements so arranged and related as to be particularly useful and convenient for use by teachers, lecturers, sales people, etc.

A further object of my invention is to provide a device of the general character referred to which is light, compact, and convenient to operate, making it advantageous as a portable unit easily moved from place to place and convenient to use when placed on a desk, a table, or a like support.

Another object of the present invention is to provide a device of the general character referred to of such form and construction that a powerful light source may be used making it possible to project images satisfactorily in ordinary daylight without disagreeable or excessive heating of parts used or contacted by the operator.

A further object of the invention is to provide a device of the general character referred to involving a very simple, compact, and yet effective optical system having few simple economically mounted elements.

The various objects and features of my invention will be fully understood from the following detailed description of a typical preferred form and application of the invention, throughout which description reference is made to the accompanying drawings, in which:

Fig. 1 is a side elevation of a typical construction embodying my present invention, showing it mounted on a suitable horizontal support. Fig. 2 is an enlarged central sectional view of the structure shown in Fig. 1 taken as indicated by line 2—2 on Fig. 4. Fig. 3 is an enlarged detailed sectional view taken as indicated by line 3—3 on Fig. 2. Fig. 4 is a plan view of the structure as shown in Fig. 2. Fig. 5 is an enlarged sectional view taken as indicated by line 5—5 on Fig. 2. Fig. 6 is an enlarged plan section taken as indicated by line 6—6 on Fig. 2. Fig. 7 is an enlarged plan section taken as indicated by line 7—7 on Fig. 2. Fig. 8 is an enlarged sectional view taken as indicated by line 8—8 on Fig. 2. Fig. 9 is a transverse sectional view taken as indicated by line 9—9 on Fig. 2, and Fig. 10 is an enlarged sectional view taken as indicated by line 10—10 on Fig. 4.

The construction embodying my present invention involves, generally, a body A, illuminating means B located in and carried by the body A, air circulating means C located within the body A, an image projector D and a mounting E for the projector D supporting it on or from the body A.

The body A is a box-like structure or unit and in accordance with the preferred form of my invention it is characterized by a foraminous bottom 10, upstanding sides 11 and 12 and a front end 13, a back end 14 and a top 15. The bottom 10 may be a substantially flat plate-like part with depending legs 16 which serve to support it a suitable distance above a support S such as the top of a table, desk, or other like supporting means. In accordance with my construction the end portion of the bottom 10 toward the front end of the body and adjoining the front 13 of the body has apertures or vent openings 17 therein which are limited as to size, while the balance of the bottom or the portion toward the rear end of the body is formed with two large openings 18 so formed as to leave a central rib 19 extending longitudinally of the body at the center thereof, as indicated in Fig. 4 of the drawings. The various openings provided in the bottom are of such size, and are so located, as to permit of a maximum amount of circulation of air through the bottom mainly out of the body through the bottom, at the same time minimizing the amount of light escaping through the bottom.

The sides 11 and 12 of the body are vertical, upstanding elements that may be flat or panel-like in form, and in accordance with my invention each side of the body has large openings or apertures 20 occupied by plates 21, each provided with a plurality of louvers 22. The plates 21 may be sheet metal parts with horizontal cuts formed therein, and with the portions immediately above or adjacent the cuts struck or deflected outwardly to form the louvers 22. In accordance with the preferred form of my invention a light trap is established by providing a plate 23 at the inner side of each plate 22. The plates 23 are provided with louvers 24 that are faced upwardly or opposite to the louvers in the plates 21. The plates 23 are related to the plates 21 so that the louvers 22 and 24 establish passages that extend downwardly and outwardly as indicated by the arrows at the left in Fig. 9, thus providing ample air passages establishing openings through which little light will pass. As shown in Fig. 9 of the drawings, a plate 23 is provided at the side 12 directly opposite the light, whereas no such plate is provided at the opposite part of wall 11 since the motor that drives the air circulating fan occurs at this point making such a plate unnecessary.

The front 13 of the body is preferably arranged to extend between the forward ends of the sides 11 and 12 and it extends upwardly from the base 10 to the top 15. In the preferred form of the invention the front 13 is a panel or plate formed separate from the other parts of the body so that it may be removable therefrom and act as a closure for the body. In the case illustrated the front 13 is shown as a plate extending vertically from the bottom 10 to a depending transverse flange 26 on the top 15. The front 13 is releasably held in position by ears 27 that project upwardly from its upper edge to engage behind the flange 26, while the lower edge portion of the front is held in place by a simple screw fastener 28 that connects to an upstanding lug 29 on the bottom 10. When the fastener 28 is released the bottom end portion of the front 13 can be pulled forward, allowing the front to drop and thus become disengaged from the flange 26.

The back of the body may be a simple panel or plate-like part extending between the rear ends of the sides and extending vertically from the bottom 10 to the top 15. In the preferred form of construction the back 14 is formed integral with the sides 11 and 12 while the bottom 10 is a separate part joined to the sides and back by suitable fasteners such as screws 31.

The top 15 is a platform-like member having a flat smooth top face 30 covering and supported by the other body parts hereinabove described. In the preferred form of the invention the top 15 extends transversely of the body between the sides 11 and 12 and it extends from the back 14 forward and over the front 13 to have an overhanging portion 32 that projects a substantial distance forward of the body. The top 15 rests upon the sides and back of the body and may be suitably joined thereto as by fasteners 33 in the form of screws. In the preferred construction the top 15 has a depending marginal flange 34 which fits over or embraces the sides and back of the body concealing the upper edges of these parts. In accordance with my invention the upper edge portion of each side for a substantial length of the body, is deflected inwardly to form a lip 36 which terminates short of the top 15, and the upper edge portion of each side provided with the lip 36 is spaced inward from the depending marginal flange 34 of the top, thus establishing an air passage 35 between each side of the body and the top of the body, allowing circulation of air immediately adjacent the top of the body to effectively cool it. Further, with the construction that I have just described there is a minimum of connection or mechanical contacting between the top 15 and the other parts of the body, minimizing conductivity of heat to the top.

In accordance with my construction a large opening 40 is provided in the top 15 occupying a substantial portion of the top, particularly the rear portion thereof, and a transparent member or window 41 is carried by the top to cover the opening 40. In the preferred construction the window 41 is a panel or plate of glass or the like and it is recessed into the top 15 to rest on a shoulder 42 so that its top surface 43 is flush with the top surface 30 of the top 15. In practice the window may vary widely in size and form, it being preferred, however, to make it as large as practical and also to make it round as shown in the drawings. In the case illustrated the window 41 is retained in position on the shoulder 42 by diametrically opposite retainers 46 screwed or otherwise fastened to the top 15 to overhang the window 41. The retainers 46 are preferably provided with projecting lips 47 which are spaced somewhat above the window 41 to form guides and holders for a plate or cell 48 that may be arranged on the structure as illustrated in the drawings.

The illuminating means B is provided within the body A to provide light to illuminate a plate 48 located on the top 15 in register with the window 41. By my invention I provide a strong shaft of light to illuminate the plate, the light being directed upwardly through the window 41 to the plate.

The illuminating means involves, generally, a light source 50, a concentrating reflector 51, an angular reflector 52, and a condenser lens 53. The light source 50 preferably involves a lamp 55 of suitable size and capacity carried by a suitable socket 56. The socket 56 is preferably mounted on the base 10 close to the front 13 of the body. The lamp is preferably under control of a suitable switch 57 which I prefer to mount on the inner side of bottom 10, preferably adjacent one edge thereof so that the operating member of the switch depends from the bottom 10 to occur in the space between the bottom and the support S, at which point it is protected against injury or accidental operation and yet is convenient so that the operator can reach it whenever necessary.

The concentrating reflector 51 is located adjacent the lamp 55 and forward thereof or between the lamp 55 and the front 13 of the body. The reflector 51 may be mounted on a suitable bracket 60 and, as shown in the drawings, may have a concave reflector face 61 facing the lamp to direct light from the lamp horizontally toward the rear of the body. In the construction illustrated the front 13 of the body is provided with an aperture 62 equipped with a plate 63 having louvers 64, which plate 63 is similar to the plates 21 hereinabove described. By locating the reflector 51 between the lamp and the plate 63, as shown in Fig. 2, of the drawings, I make it unnecessary to provide means such as plates 23 on or in connection with the plate 63 to check excessive passage of light therethrough.

The reflector 52 is a flat reflector serving to change the direction of light generated by and issuing from the lamp 55 and reflector 51 so that such light is directed upwardly or vertically through the window 41 of the top 15. In accordance with my invention the reflector 52 may be a simple mirror carried in a suitable frame 66 supported by a mounting bracket 67, which bracket is mounted on or carried by the rib portion 19 of the bottom 10 and may be of light construction, say for instance of sheet metal construction, so that it can be readily bent or deflected to set the mirror at the desired angle.

The condenser lens 53 receives light from the interior of the body A and particularly from the mirror 52 and directs it vertically in a concentrated shaft or beam to shine upwardly through the window 41. In accordance with my invention the condenser lens 53 involves a split ring 70 holding two oppositely arranged lenses 71.

The lenses are plano-convex lenses arranged with their convex sides adjacent each other. The ring 70 has marginal groove portions 73 holding the edges of the lenses 71 and the ends of the ring 70 are secured together by screw fasteners 74. The ring 70 is mounted in or secured to a suitable holder 75 provided in the body, preferably an annular holder depending from the top 15. In the case illustrated the holder 75 is an annular part depending from the top 15 and has a lower inwardly extending flange 76 on which the ring 70 rests. If desired, suitable fasteners such as screws 77 may be provided to secure the ring 70 to the holder 75.

The air circulating means C is important to successful operation of the device since a lamp of sufficient power to generate light enough to facilitate projection during daylight generates a considerable amount of heat and unless that heat is effectively disposed of it will be absorbed in the various parts of the structure causing distortion and making the device uncomfortable to use. The means C that I have provided involves a fan 80 located in the body A immediately adjacent the lamp 55 and a motor 81 mounted in the body to drive the fan. In accordance with my arrangement the fan is located between one side of the body and the lamp, say for instance, between the side 11 and the lamp, and the fan operates to draw cold air into the body through the louvered plate or plates 21 at side 11 and through the opening 35 at the upper edge portion of the side 11, and it serves to direct such air over or around the lamp to pick up heat therefrom and to thereafter flow out of the body A through the apertures in the bottom 10 and through the louvered plates 21 of side 12. The motor 81 is preferably mounted on a suitable bracket 83 located at the inner side of the side 11 so the motor is between the side 11 and the fan 80, the fan being immediately adjacent the lamp 55. With this arrangement the motor 81 makes it unnecessary to provide means such as plates 23 in connection with the louvered plate 21 of side 11 which is opposite the lamp 55. In practice I prefer to wire the motor 81 so that it is controlled simultaneously with the lamp 55, that is, so that the switch 57 controls both the lamp and the motor, with the result that it is impossible to ever operate the lamp without the motor operating to generate the desired cooling effect.

In the preferred form of my invention I provide a heat deflector 85 in the body immediately above the lamp or between the top of the lamp and the top 15 which deflector may be a sheet metal baffle arrangement so shaped and provided with flanges or like parts as to prevent direct radiation of heat from the lamp to the top and at the same time such as to aid in directing the flow of air within the body so that the flow is most advantageous.

The image projector D involves, generally, a projection lens 90 and a reflector 91 both mounted in a single case 92. The lens 90 involves an assembly of lens members 93 carried in a holder 94. The case 92 has a bottom opening 95 and the holder 94 is secured to the bottom of the case so that the lens 90 is in register therewith. The case 92 has a front aperture or opening 96 preferably provided with a transparent closure 97 which may be of clear glass or the like.

The reflector 91 is a simple flat reflector located in the case 92 above the lens 90 and serving to receive light directed vertically by the lens 90 and to throw or reflect such light horizontally as indicated by the center light in Fig. 2 of the drawings.

In practice I prefer to provide means for adjusting the angle of the reflector 91 so that the shaft of light reflected thereby may be varied somewhat in either direction from a true horizontal in order to best accommodate the apparatus to a particular screen or board on which an image is to be projected.

In the particular case illustrated the reflector 91 is a suitable mirror 100 having its lower edge portion held by a flexible bracket 101 mounted in the lower portion of case 92. An adjusting screw 103 is engaged with the reflector 91 to normally hold it in the desired position which screw is operable to vary the angle at which the reflector is held. In the particular case illustrated the screw 103 is carried by the case 92 to project into it from the back 104 of the case where the screw has an operating knob 105. The screw is threaded through a nut member 106 having trunnions 107 engaged in ears 108 projecting from the upper edge portion of the reflector. With this construction, as the screw is rotated the nut is moved forward or backward carrying with it the upper edge portion of the reflector. It is desirable in practice to provide a spring 109 between the back of the case and the nut 106 to maintain the adjusting mechanism under some pressure in order to prevent play or looseness in the mechanism.

The mounting means E for the projector D releasably couples the projector to the body A with the lens 90 in vertical alignment above the window 41 in the top 15 of body A. In accordance with the preferred form of my invention the mounting E includes, generally, a post 110 detachably connected with the body A to project upwardly therefrom, preferably at the rear end portion of the body, a head 111 carried by the post to be shiftable vertically on the post, and a bracket 112 connecting the head and the case 92 of the means D.

The post 110 may be a simple, straight, tubular part entering the body 10 through an opening 113 in the top 15 adjacent the back 14 and depending downward in the body so that its lower end enters a socket 114 in the bottom of the body. A lug 115 is provided in the socket to enter a notch 116 in the bottom of the post so that the post when in position is held against rotation. The post may be releasably set in the desired position relative to the body through any suitable means. In the drawings I have shown a set screw 116 carried by the body where the top and back join, which screw is conveniently located and can be operated to clamp and hold the post.

The post 110 projects a substantial distance above the body, as shown in Fig. 1, and the upper end portion of the post carries the head 111. The head 111 may vary widely in form and construction and it is preferably adjustable vertically on the post. In the particular case illustrated the head is shown as involving an upwardly faced hook portion 120 that carries the bracket 112 and spaced arms 121 projecting from the hook portion 120 which arms engage and embrace the post. The portions of the arms that engage the post are split at 122 and set screws 123 are provided so that the split portions of the arms can be clamped or set on the post preventing movement of the head vertically on the post.

One of the arms is provided with a transverse pin 125 which operates in a vertical or longitudinal slot 126 in the upper end portion of the post thus serving to prevent rotation of the head on the post.

The bracket 112 involves, generally, a transverse plate 130 with a yoked or split part 131 projecting therefrom receiving the hooked portion 120 of the head. A screw 132 is carried by the split part 131 to enter the hook 120 and is operable to clamp the part 131 to the hook. In the particular case illustrated the case 92 is detachably connected to the plate 130 by lugs 140 projecting from the case 92 and normally seated in notches 141 provided in the plate. Retaining nuts 142 are carried by the lugs 140 and when tightened secure the case 92 on the plate.

The plate or cell 43 employed with my construction is preferably a transparency having marked or otherwise provided thereon markings, legends, figures or the like which are to be projected onto a screen or like surface. In practice I may use glass, Celluloid, plastic, or other transparent slides bearing the desired material. In operating the device the switch 54 is closed, energizing the lamp 55 and the motor 81 that drives the fan 80. A shaft of light is then directed upwardly through the condenser lens 53 and through the plate or cell 43 located on the window portion of the top 15. The light projected through the plate or cell 43 is picked up by the projector lens 90 and after passing the reflector lens is reflected by the reflector 91 to shine horizontally onto the desired surface.

To gain the proper focus of the light on the screen or surface the head 111 is adjusted vertically on the post 110. This adjustment and the adjustment of the reflector 91 to change the horizontal angle of the projected beam are the only adjustments that need be made by the operator in the normal course of using the device. While the lamp is energized and the fan in operation the operator may change plates or cells 43 at will and if the apparatus is located on a desk or table adjacent an operator who is speaking or conducting a meeting, or the like, the operator may use a pointer to point out or indicate particular parts of the material on the plate, or may even mark on the plate, which markings will appear on the screen.

Through the construction that I have provided the top 15 provides, in effect, a convenient disclike part for the use of an operator who is a speaker or lecturer, the parts 47 serving as convenient guides and holders for plates or slides that the operator may wish to locate on the apparatus to be projected onto the screen.

Through the construction that I have provided there is ample circulation of air transversely through the body, most of the air being drawn into the body through the side 11 and issuing from the body through side 12, and bottom 10, although there is, of course, a certain amount of circulation through the front end 13 of the body. This circulation of air effectively carries away or dissipates the heat generated by the lamp 55 so that the top 15 never becomes objectionably hot. Furthermore, through the construction that I have provided the powerful lamp 15 located in the body is effectively shielded so that there is not an undesirable amount of light escaping from the body, the amount that does escape being so confined and directed as to merely provide slight illumination in the vicinity of the body generally serving as an aid to the operator in the course of handling slides, plates, or other material.

When it is desired to transport the device the fastener 116 may be released, detaching the post from the body, and if desired the screw or fastener 132 may be released detaching the image projector D from the head of the post. With the parts thus separated they may be conveniently packed and handled. In practice it has been found desirable to form a majority of parts of the structure of magnesium castings as such material has the desired thermal and physical characteristics and is also very light, making the structure unusually simple to handle.

Having described only a typical preferred form and application of the invention, I do not wish to be limited or restricted to the specific details herein set forth, but wish to reserve to myself any variations or modifications that may appear to those skilled in the art and fall within the scope of the following claims:

Having described my invention, I claim:

1. A projector of the character described including, a box-shaped body having a bottom, side walls with vent openings, an imperforate end wall and a top having a window, illuminating means in the body including a lamp located between the side walls and a reflector adjacent said end wall and receiving light horizontally from the lamp and directing it upwardly through the window, cooling means including a motor driven fan in the body circulating air in through one side wall and out through the other side wall, an image projector above the body projecting light passed by the window, and mounting means for the image projector detachably connecting the image projector with the body for vertical adjustment above the window and including a vertical post projecting upward from the top and depending a substantial distance into the body adjacent said end wall, the post being separable from the body and being supported thereby at the top of the body and at the bottom of the body.

2. A projector of the character described including, an elongate box-shaped body having an imperforate end, an end with vent openings, opposite sides with vent openings, a top having a window adjacent the first mentioned end of the body and an extension projecting from the top of the body to project beyond the end with vent openings, illuminating means in the body including a lamp adjacent the first mentioned end and a reflector receiving light horizontally from the lamp and directing it upwardly through the window, cooling means including a motor driven fan in the body between the lamp and one side of the body circulating air therethrough, a post releasably supported by the body immediately adjacent the first mentioned end thereof and to project upward therefrom and an image projector supported by the post above the body projecting light passed by the window longitudinally of the body and over the said extension.

3. A projector of the character described including, a box-shaped body having a foraminous bottom, louvered sides, a rear end, a detachable front end, and a top with a window at the rear portion and with the forward portion projecting beyond the front end, illuminating means in the body including a lamp in the forward end portion of the body, a condenser lens below the window and a reflector receiving light from the lamp and directing it up through said lens, cooling means including a motor driven fan between one side of the body and the lamp drawing air in through louvers at said side and directing it onto the lamp to flow out of the case through the bottom and the louvers at the other side, an image projector above the window including, a closed case with a front opening, a projector lens in the bottom of the case and a reflector located wholly within the case receiving light from the lens and directing at out through the front opening of the case, and mounting means for the image projector including a vertical post detachably carried by the body and a head vertically adjustable on the post and having a part projecting laterally of the post and detachably supporting the image projector.

4. A projector of the character described including, a box-shaped body having a foraminous bottom, louvered sides, a rear end, a detachable front end, and a top with a transparent window at the rear portion retained by clips having plate retaining projections and with the forward portion projecting beyond the front end, illuminating means in the body including a lamp in the forward end portion of the body, a condenser lens carried by the top below the window and a reflector carried by the bottom receiving light from the lamp and directing it up through said lens, cooling means including a motor driven fan between one side of the body and the lamp drawing air in through said side and directing it onto the lamp to flow out through the bottom and the other side, a single control for the illuminating means and cooling means including a switch carried by the bottom with an operating part projecting below the bottom, an image projector above the window including, a unitary case, a projector lens in the case and a reflector in the case receiving light from the lens and directing it out through the front of the case, and mounting means for the image projector including a vertical post detachably carried by the top and bottom of the body and a head adjustable vertically on the post and having a projecting part detachably supporting the image projector.

HAROLD G. FITZGERALD.

REFERENCES CITED

The following references are of record in the file of this patent:

UNITED STATES PATENTS

| Number | Name | Date |
| --- | --- | --- |
| 1,262,180 | Davies | Apr. 9, 1918 |
| 1,319,820 | Williams | Oct. 28, 1919 |
| 1,545,674 | MacKay | July 14, 1925 |
| 1,919,922 | Baker et al. | July 25, 1933 |
| 1,932,399 | Decker | Oct. 31, 1933 |
| 1,952,249 | Halloran | Mar. 27, 1934 |
| 1,966,531 | Tint | July 17, 1934 |
| 2,027,679 | Debrie | Jan. 14, 1936 |
| 2,310,273 | Bancroft | Feb. 9, 1943 |
| 2,381,260 | Coker | Aug. 7, 1945 |